United States Patent [19]

Hicks

[11] 4,247,810

[45] Jan. 27, 1981

[54] ANGLE TO BIPOLAR ANALOG CONVERTER

[75] Inventor: Donald C. Hicks, Phoenix, Ariz.

[73] Assignee: Sperry Corporation, New York, N.Y.

[21] Appl. No.: 55,140

[22] Filed: Jul. 5, 1979

[51] Int. Cl.³ .......... G05B 1/06

[52] U.S. Cl. .......... 318/661; 318/654

[58] Field of Search .......... 318/654, 655, 661, 595; 340/347 SY

[56] References Cited

U.S. PATENT DOCUMENTS

| | | | |
|---|---|---|---|
| 3,617,863 | 11/1971 | Espen | 324/86 |
| 3,701,936 | 10/1972 | Martin et al. | 317/595 |
| 4,011,440 | 3/1977 | Steglich | 318/654 |
| 4,093,903 | 6/1978 | Thomas | 318/654 |

*Primary Examiner*—Gene Z. Rubinson

*Assistant Examiner*—Eugene S. Indyk

*Attorney, Agent, or Firm*—Howard P. Terry

[57] ABSTRACT

The control system uses shaft angle controlled synchro resolver devices for producing reversible polarity signals related to the variable shaft angle position and independent of variations in the amplitude of the electrical carrier excitation of the synchro resolver and of spurious phase shifts seated therein.

11 Claims, 3 Drawing Figures

ANGLE TO BIPOLAR ANALOG CONVERTER

BACKGROUND OF THE INVENTION

1. Field of the Invention

The invention relates to control systems in which the purpose is to generate an analog reversible polarity signal related in amplitude to a variable shaft angle position and more particularly to control systems using shaft angle controlled synchro resolver devices for producing such reversible polarity signals related to the variable shaft angle position and independent of variations in the amplitude of the electrical carrier excitation of the synchro resolver and of spurious phase shifts seated therein.

2. Description of the Prior Art

One of the known prior art synchro resolver systems for generating a variable polarity analog voltage proportional to the position of a shaft solves the equation:

$$V_o = KE\,(1-\cos\theta+|\sin\theta|).$$

Where $V_o$ is the desired analog voltage, K is ideally a proportionality constant, E is the synchro excitation carrier peak amplitude and $\theta$ is the relative shaft angle. However, variation of the carrier peak amplitude E in this prior system causes the proportionality factor K to change undesirably and there are also produced discontinuities in the output analog signal when the shaft angle $\theta = \pm 45°$. The dependence of $V_o$ on the unconstant voltage E in the foregoing equation can be removed by continuously sensing the value of E and by performing a corrective electronic division only at the cost of additional equipment.

A second method converts the synchro resolver cosine $\theta$, sine $\theta$ output data into one phase shifted signal and utilizes a phase detector to provide the desired variable polarity output signal. Gradient errors due to the undesired dependence of $V_o$ on E are eliminated and discontinuity effects are reduced. However, intermediately generated variable phase shift errors arising especially in the synchro resolver disadvantageously reduce the accuracy of this second technique. Accordingly, the present invention is considered to be a significant one over prior art concepts such as that of the R. E. Thomas U.S. Pat. No. 4,093,903, issued June 6, 1978 and assigned to Sperry Rand Corporation and over systems of the kind such as that disclosed in the K. G. Martin U.S. Pat. No. 3,701,936. While such prior systems have found utility in some degree, it is desired to avoid any system in which the output can be a function of the peak excitation of the synchro resolver, and to avoid the abrupt discontinuities present when the designer elects to use switching between input trigonometric functions. While the Thomas and Martin references strive to deal with the problem of extending the angular operation of a resolver, they also deal without major success with the problem solved by the present invention.

SUMMARY OF THE INVENTION

The present invention converts the conventional synchro resolver input signals into outputs $V_1 = E \sin\theta \cos(107\,t+\phi_R)$ and $V_2 = E\cos\theta\cos(\omega t+\phi_R)$, wherein $\omega$ is the carrier frequency as will be further discussed herein, into one single constant-amplitude phase-shifted signal which has the information-carrying parameter $\theta$ contained in the variable phase term. Secondly, the invention utilizes the $V_1$ and $V_2$ voltages to produce a constant-phase reference signal in phase with $\cos\omega t$ as a locally derived phase reference, avoiding internally generated spurious phase shifts, such as those normally generated in the synchro resolver. The phase-shifted signal and the locally generated phase reference are finally applied to a phase detector which produces the desired variable bipolar output proportional to shaft angle position $\theta$. Angle $\theta_1$ is the input angle for the resolver as defined by three trigonometric electrical terms, angle $\theta_2$ corresponds to the mechanical angle between the resolver stator and rotor, and $\theta$ is a measure of the electrical difference:

$$\theta = \theta_1 - \theta_2$$

According to the invention, the defects of the prior art are overcome, the variable polarity output being beneficially substantially independent of variations in the peak amplitude of the carrier of the synchro resolver output signals. Gradient changes are substantially avoided and discontinuity effects are substantially eliminated. The output of the system is substantially a linear function of shaft angle $\theta_2$ over the operating range and does not suffer errors through introduction of spurious phase shifts caused by the inherent nature of the synchro resolver.

DESCRIPTION OF THE PREFERRED EMBODIMENTS

Figure 1:
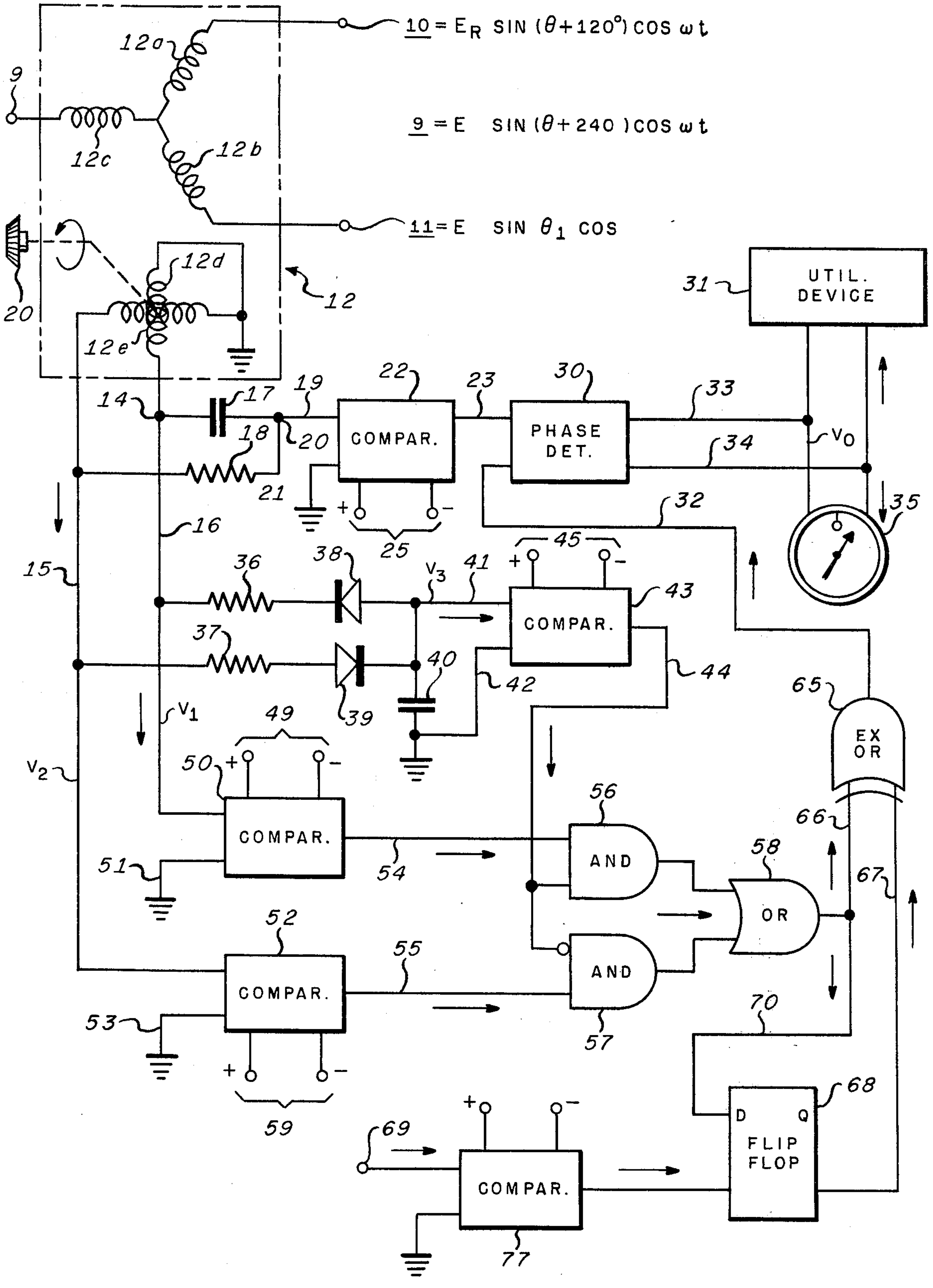
FIG. 1 is a diagram of the invention showing its electrical components and their interconnections.

Referring to FIG. 1, it will be seen that the invention provides a means for generating a unidirectional output voltage $V_o$ directly proportional in magnitude to an arbitrary angle $\theta$, which angle may be representative of any angle or other value normally met with, for example in the operation of aircraft or other navigation or computer systems. The desired signal $V_o = K\theta$ is generated by first using a conventional sine-cosine synchro resolver 12 excited at input terminal 9 of the selsyn stator coil 12*c* in the usual manner by a voltage $E_R \sin(\theta_1+240°)\cos\omega t$, at the selsyn stator input terminal 10 of coil 12*a* by a voltage $E_R \sin(\theta_1+120°)\cos\omega t$, and at the terminal 11 of coil 12*b* by a voltage $E_R \sin\theta_1 \cos\omega t$. These stator input voltages may be generated in ordinary ways in other parts of a conventional selsyn or other data transmission system, the $\cos\omega t$ portion of the voltages being originally supplied by well know means, such as by a two-phase electrical generator (not shown) normally operated in aircraft as a power supply at 400 Hz, for example. The outputs of selsyn resolver rotor 12R, derived in the rotor coils 12*d* and 12*e*, appear respectively at junctions 14 and 15. Coil 12*d* is conventionally called the sine coil and coil 12*e* the cosine coil. The relative angular position of the resolver rotor and shaft, which is denoted by $\theta_2$, is manually introduced by turning a knob 20, though it may be controlled by a navigation computer, for example, where an accessible shaft positioned in terms of an angle or value $\theta$ is readily available. In this manner, the signals shown in FIG. 2, $V_1 = E\sin\theta\cos(\omega t+\theta_R)$ and $V_2 = E\cos\theta\cos(\omega t+\theta_R)$, are available for present purposes on the respective junctions 14, 15*a*. It will be understood that E is the peak value of these electrical signals, and that $\omega$ is a carrier frequency in radians per second. The value $\phi_R$ is a small but significant phase shift which ordinarily varies with $\theta$ and temperature and is also dependent on the selected resolver 12. Although normally processing basically angular data, the invention may be used where the data displayed is altitude error, for example. In the display of angle data, the variable $\theta$ is restricted as follows:

$$-180° < \theta < +180°$$

by means yet to be discussed. By way of example, in FIG. 1, utilization device 31 may be a conventional flight director including its own altitude display. The utilization device 31 may be calibrated to see the zero degree position of resolver 12 as representing a zero altitude error, a +180° position as representing a +2500 foot altitude error, and a −180° position as representing a −2500 foot altitude error, for example.

The effects of undesired variations in the magnitude of the voltage E are removed by the use of two cooperating circuits; the first is a constant amplitude, variable phase circuit such as taught in the D. A. Espen U.S. Pat. No. 3,617,863 for a "Constant Amplitude Variable Phase Circuit", issued Apr. 2, 1970 and assigned to Sperry Rand Corporation. It is used to generate a phase modulated signal on lead 23. This signal is then phase detected in circuit 30 after the separate local generation of a phase reference signal found on electrical lead 32. The phase reference signal of lead 32 is derived using both of the aforementioned $V_1$ and $V_2$ signals on terminals 14, 15*a*, thus eliminating the effects of any resolver phase error.

Figure 2:
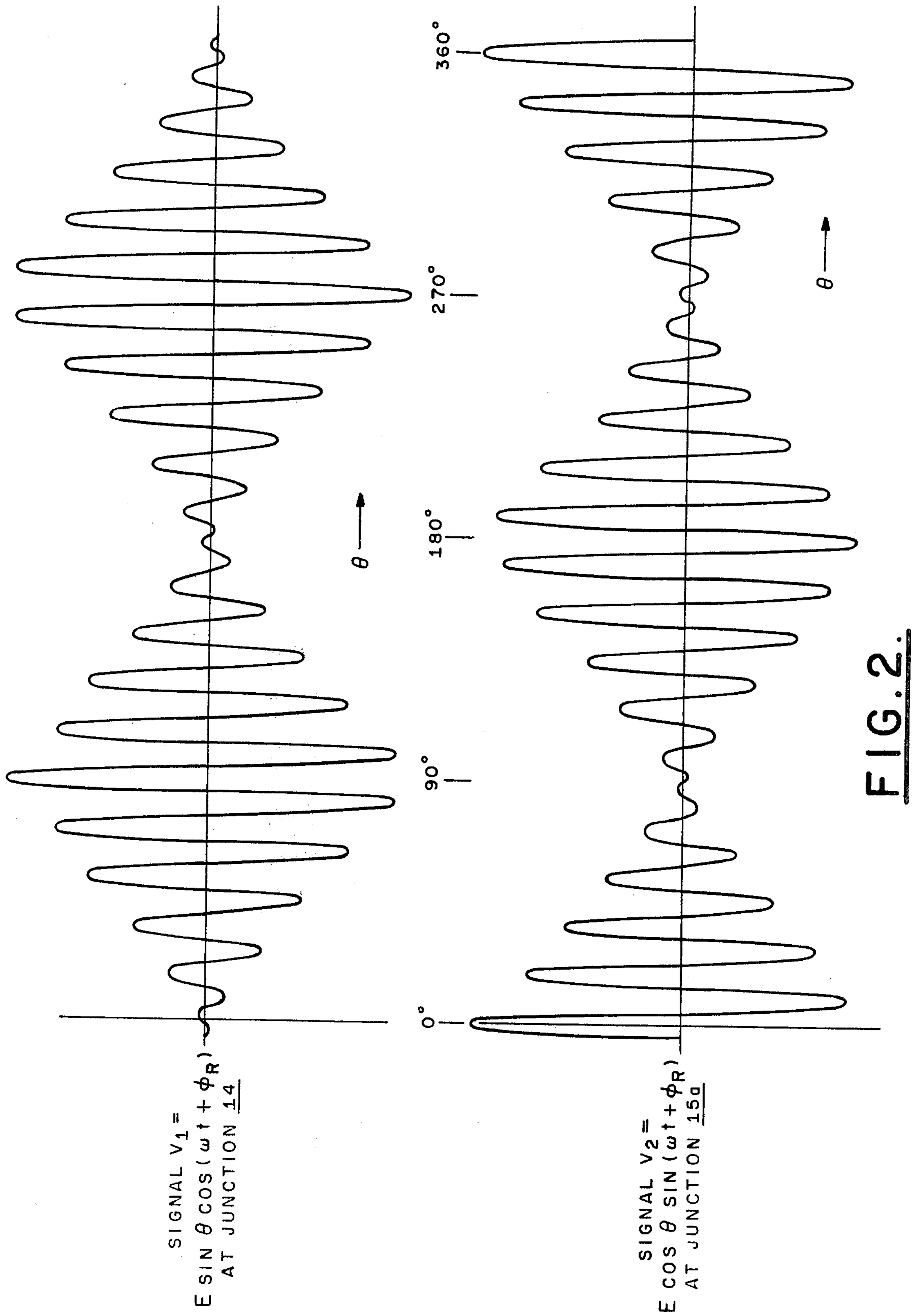
FIGS. 2 and 3 contain plots of various significant electrical wave forms useful in understanding the operation of the invention.

In the constant amplitude-variable phase circuit, there is supplied via junction 14 the voltage $V_1$ across capacitor 17 to the common junction 20. Voltage $V_2$ is coupled via lead 13 through resistor 18 to the same common junction 20, which junction is coupled into comparator circuit 22 via electrical input lead 19. The second input lead 21 of comparator 22 is grounded. Comparator 22 may take the form of a conventional operational amplifier internally connected in the usual manner to function as a comparator with the aid of equal and opposite unidirectional voltages coupled to leads 25 from an appropriate power supply (not shown). The R-C network composed of resistor 18 and capacitor 17 acts as a summing network, while comparator 22 buffers the resultant sum signal found at the common terminal 20, removing amplitude changes. The output signal at lead 23 is desirably a low impedance, single wire output highly insensitive to load variations. Lead 23 thus supplies a constant amplitude signal to one input of the conventional phase detector 30 with a phase varying directly as the angle $\theta$ changes. A reference phase signal for application to the second input lead 32 of phase detector 30 is generated by the remaining circuit. For this purpose, the voltages $V_1$ and $V_2$ of FIG. 2 are coupled via the respective branching leads 15 and 16 for the operation of a comparator circuit 43 generally similar to comparator 22 and similarly being supplied with opposite unidirectional reference voltages at leads 45. For this purpose, voltage $V_1$ is coupled through resistor 36 and diode 38, poled as indicated in the drawing, to one input lead 41 of comparator 43. Similarly, voltage $V_2$ is supplied through resistor 37 and diode 39, poled opposite to diode 38, to the same input lead 41. The grounded capacitor 40 filters the rectified signal of diode network 36, 37, 38, 39. The rectifier circuit places the largest of the two output voltages across capacitor 40; the voltage across capacitor 40 is positive when the output of the resolver cosine winding 12*e* is largest and is negative when the output of the sine winding 12*d* is largest. The second input of comparator 43 is grounded via lead 42 and its output on lead 44 comprises a switching or multiplexing wave form as seen at 104 in FIG. 3, as will be further explained.

Figure 3:
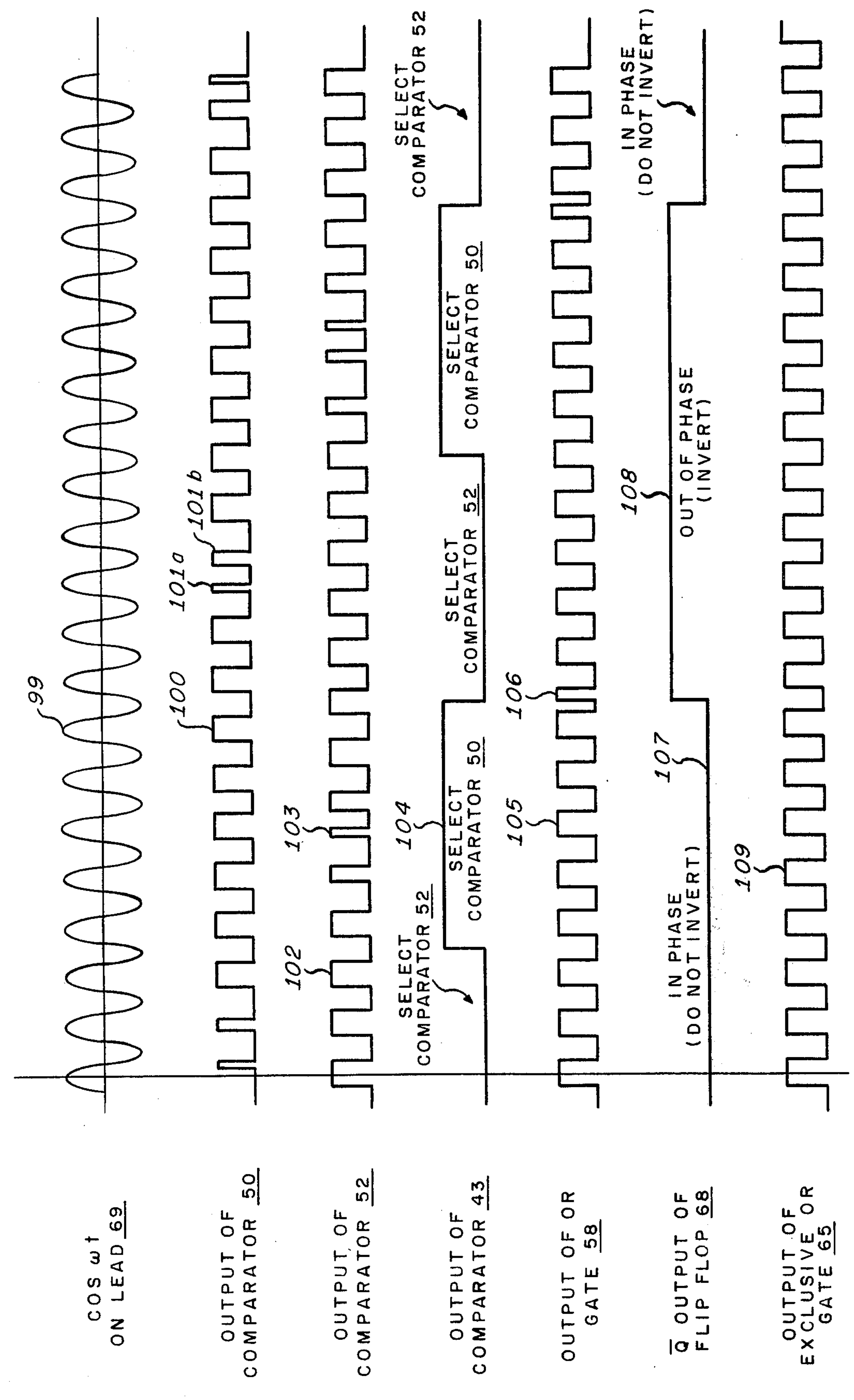

In an additional circuit arrangement, voltage $V_1$ is coupled directly to an input of a comparator 50, supplied with opposed reference voltages via leads 49, and whose second input is grounded at 51. Its output wave 100 of FIG. 3 is coupled via lead 54 to one input of AND gate 56. In a similar manner, voltage $V_2$ is coupled to an input of a further comparator 52, again supplied with opposed reference voltages as by leads 59, and whose second input is grounded at 53. The output of comparator 52 is wave 102 of FIG. 3 and is coupled by lead 55 to one input of an AND gate 57. For alternately switching the outputs of comparators 50, 52 through OR gate 58, the multiplexing output voltage 104 of comparator 43 on output lead 44 is connected to a second input of AND gate 56 and also to the inverting second input of AND gate 57.

Either signal applied to OR gate 58 is now free selectively to pass via lead 66 to an input of the EXCLUSIVE OR gate 65 as at 105 in FIG. 3. The output 105 of OR gate 58 is also supplied by lead 70 to the D terminal of a conventional flip-flop 68 whose clock terminal CL is controlled by a pulsed voltage derived from the E cos $\omega$t signal provided as a reference voltage on lead 69 from the system carrier frequency power source (wave 99 of FIG. 3). The clocking signal is derived in a final comparator 71 similar to comparators 22, 43, 50, and 55 and also having one grounded input terminal. The consequent $\overline{Q}$ output of flip-flop 68 (wave 107, 108 of FIG. 3) is connected by lead 67 to the secod input of EXCLUSIVE OR gate 65.

The diodes 38, 39, capacitor 40, resistors 36, 37, and comparator 43 control the multiplexing circuit comprising gates 56, 57, 58 so as to select only the largest of the two square waves emanating from comparators 50, 52 for supply through OR gate 58. Flip-flop 68, in effect compares the multiplexed output of OR gate 58 with the alternating current reference of terminal 10. The output of flip-flop 68 is combined with the output of OR gate 58 in the EXCLUSIVE OR gate 65, to invert or to buffer the phase reference signal as required to maintain the sign of that local phase reference the same as the a.c. reference on terminal 69. It will be observed that the effects of the generation of pulses of non-standard width in the several pulsed wave trains, such as pulses 101*a*, 101*b* in wave train 100, pulses 103 in wave train 102, and pulses 106 in pulse train 105 are rendered harmless through the selection of the timing of the multiplexing and gating operations. For this reason, they do not appear on the local phase reference lead 32, as is seen at 109 in FIG. 3.

The variable phase, constant amplitude signal on lead 23 and the reference phase cophasal with cos $\omega$t on lead 32 are coupled to the conventional phase detector 30 as previously mentioned. Thus, the phase detected signal on leads 33, 34 is the desired reversible polarity, variable amplitude signal which may be used to operate a display such as the zero-center or other direct current meter 35 or other similar displays. Alternatively, the phase detected signal may be provided to utilization equipment 31 adapted to be controlled by such a reversible polarity, variable amplitude signal or, after its modification, to display it as in a conventional flight director.

In operation, the voltages $V_1$ and $V_2$ at junctions 14 and 15a are seen to vary as sin θ and cos θ, respectively. The signals at junctions 14 and 15a are converted into respective square wave trains 100, 102 by comparators 50 and 52. As seen in FIG. 3, these outputs exhibit distortions, as at 101a and 103, which occur when the voltages $V_1$ and $V_2$ pass through null values as seen in FIG. 2. It is also seen that the distortion regions do not overlap and are well separated. Comparator 43 and the multiplexer formed of gates 56, 57, and 58 provide means for reliably selecting information only from undistorted regions of waves 100, 102.

The input to comparator 43 is $E|\cos\theta| - E|\sin\theta|$, or $E(|\cos\theta| - |\sin\theta|)$ and is created by the action of resistors 36, 37, diodes 38, 39, and capacitor 40 on the input voltages on lead 41. The output of comparator 43 on lead 44 commands the multiplexer circuit to select comparator 50 when $|\sin\theta| > |\cos\theta|$ and to select comparator 52 when $|\cos\theta| > |\sin\theta|$. This process ensures that the comparator 50 or 52 which has the undistorted output is always selected to form the phase reference on lead 32. The output of OR gate 58 is the phase reference with a 180° shift for the region $135° \leq \theta \leq 225°$. This 180° phase shift is caused by the phase reversals occurring in the waves of FIG. 2.

The flip flop 68 compares the phase of the output of gate 58 on lead 70 with the system phase reference E cos ωt found on terminal 69 as an input to comparator 77. If the output of OR gate 58 is in phase with E cos ωt, the Q output of flip flop 68 is a logical ZERO. This event causes EXCLUSIVE OR gate 65 to pass the output of OR gate 58 without inversion to lead 32. If the output of OR gate 58 is out of phase with E cos ωt, the $\overline{Q}$ output of flip flop 68 is a logical ONE, causing EXCLUSIVE OR gate 65 to invert the output of OR gate 58 and thus correcting the 180° phase shift. Accordingly, the signal at the output 32 of EXCLUSIVE OR gate 65 may serve as a locally generated phase reference for detector 30.

Accordingly, it is seen that the invention overcomes the defects of the prior art, the variable polarity output being substantial independent of variation in the peak value of the synchro resolver excitation voltage. Gradient changes and undesired discontinuities are substantially eliminated and the output of the system is substantially a linear function of shaft angle. Further, the output is not adversely affected through the introduction of spurious phase shifts generated within the synchro resolver.

While the invention has been described in its preferred embodiments, it is to be understood that the words which have been used are words of description rather than of limitation and that changes may be made within the purview of the appended claims without departing from the true scope and spirit of the invention in its broader aspects.

What is claimed is:

1. Apparatus responsive to first and second outputs of a carrier frequency signal excited selsyn resolver, said first and second outputs being respectively proportional to sine and cosine values of a variable angle and to a non-constant peak carrier frequency voltage level, for generating a bipolar signal accurately proportional to the amplitude of said variable angle, said apparatus comprising:

signal combining means for converting said first and second outputs into an equivalent single, variably phase shifted, constant amplitude signal representative of said variable angle, first comparator means responsive to said selsyn resolver first output for producing a first pulse train having pulse width distortions when said resolver first output passes through zero, second comparator means responsive to said resolver second output for producing a second pulse train having pulse width distortions when said resolver second output passes through zero, multiplexer means alternately sampling said first and second pulse trains only in regions spaced from said pulse width distortions, for forming a combined pulse train, inverter means for ensuring that said samples of said first and second pulse trains have the same polarity for forming, when combined, a phase reference signal, and phase detector means responsive to said phase reference signal and to said variably phase-shifted, constant amplitude signal for providing said bipolar signal independent of said non-constant peak carrier frequency voltage level.

2. Apparatus as described in claim 1 wherein said selsyn resolver includes polyphase stator windings and sine and cosine output windings.

3. Apparatus as described in claim 1 wherein said signal combining means includes:

resistor-capacitor network means responsive to said first and second outputs, and third comparator means responsive to said resistor-capacitor network means for generating said equivalent single, variably phase shifted constant amplitude signal representative of said variable angle.

4. Apparatus as described in claim 1 wherein said multiplexer means includes:

first rectifier means responsive to said first output, second rectifier means, poled oppositely to said first rectifier means and responsive to said second output, and multiplexer comparator means responsive to said first and second recitifier means.

5. Apparatus as described in claim 4 wherein:

said first and second rectifier means include first and second series resistor means and are respectively coupled to a first input of said multiplexer comparator means, and further including:

capacitor means coupled between said first and second rectifier means and a second input of said multiplexer comparator means.

6. Apparatus as described in claim 1 wherein said inverter means includes gate circuit means responsive to said first and second comparator means and to said multiplexer comparator means.

7. Apparatus as described in claim 6 wherein said gate circuit means includes:

first AND gate means responsive to said first and to said multiplexer comparator means, second AND gate means responsive to said second and to said multiplexer comparator means, and OR gate means responsive to said first and second AND gate means.

8. Apparatus as described in claim 1 wherein said inverter means includes:

inverter comparator means responsive to said carrier frequency signal, and bistable circuit means having clock input means responsive to said inverter comparator means and having further input means responsive to said multiplexer means.

9. Apparatus as described in claim 8 further including EXCLUSIVE OR gate means responsive to a $\overline{Q}$ output of said bistable circuit means and to said multiplexer means combined pulse train for forming said phase reference signal.

10. Apparatus as described in claim 2 wherein said polyphase stator windings are so disposed as to receive the respective voltages:

$E_R \sin(\theta_1+120°) \cos \omega t$, $E_R \sin(\theta_1+240°) \cos \omega t$, and $E_R \sin \theta_1 \cos \omega t$, wherein:

$E_R$=non-constant amplitude of carrier signal $\cos \omega t$, $\theta_1$=electrical angle respresenting data being telemetered, and wherein said selsyn resolver includes rotor windings yielding the output voltages:

$V_1=E \sin \theta \cos(\omega t+\phi_R)$, and $V_2=E \cos \theta \cos(\omega t+\phi_R)$, wherein:

$\phi_R$ is a phase error characteristic of the selected selsyn resolver, and $\theta=\theta_1-\theta_2$, wherein $\theta_2$ is the mechanical angle between said stator windings and said rotor windings.

11. Apparatus as described in claim 10 wherein said multiplexer means includes:

rectifier means for generating a voltage:

$V_3=E(|\cos \theta|-|\sin \theta|)$, and comparator means responsive to said voltage $V_3$.

* * * * *